United States Patent [19]
Mehuys

[11] Patent Number: 5,930,029
[45] Date of Patent: Jul. 27, 1999

[54] OPTICAL FIBER AMPLIFIER WITH OPTIMIZED POWER CONVERSION

[75] Inventor: David G. Mehuys, Sunnyvale, Calif.

[73] Assignee: SDL, Inc., San Jose, Calif.

[21] Appl. No.: 08/982,870

[22] Filed: Dec. 2, 1997

[51] Int. Cl.$^6$ .............................. H01S 3/06; G02B 6/26
[52] U.S. Cl. .............................. 359/341; 359/161; 372/6; 372/71; 372/75
[58] Field of Search .................................. 359/134, 160, 359/341; 372/6, 33, 71, 75

[56] References Cited

U.S. PATENT DOCUMENTS

| | | | |
|---|---|---|---|
| 4,674,830 | 6/1987 | Shaw et al. | 359/341 |
| 5,287,216 | 2/1994 | Chirrauuri | 359/341 |
| 5,467,218 | 11/1995 | Takeda et al. | 359/341 |
| 5,748,364 | 5/1998 | Meli et al. | 372/6 |
| 5,801,878 | 9/1998 | Bourret et al. | 359/160 |

FOREIGN PATENT DOCUMENTS

| | | |
|---|---|---|
| 4-149525 | 5/1992 | Japan. |
| 5-275779 | 10/1993 | Japan. |

OTHER PUBLICATIONS

Mikkelsen et al, O AA '91 ; vol. 3, pp. 192–195, IEEE Sponsored, Jul. 26, 1991.

Mitsuda et al, Inst. of Elect., Info. & Commun. Engin., #4, C297, pp. 4–333, 1993.

Delavaux et al, Electronics Letters, vol. 28, #17, 2pp. (1642–1643), Aug. 13, 1992.

*Primary Examiner*—Nelson Moskowitz
*Attorney, Agent, or Firm*—W. Douglas Carothers, Jr.

[57] ABSTRACT

An optical fiber amplifier having a doped fiber, through which an input signal propagates, is bi-directionally pumped in a manner that provides for a desired composite absorption profile such as, in one case, a uniform degree of local pump energy absorbed along at least a substantial length of the fiber. Co-propagating and a counter-propagating pump sources are prescribed to have their wavelengths selected relative to the peak absorption wavelength of the amplifier to provide for a uniform composite absorption profile across the length of the fiber thereby improving the overall inversion efficiency of the amplifier as well as providing for reduced amplifier noise figure.

24 Claims, 5 Drawing Sheets

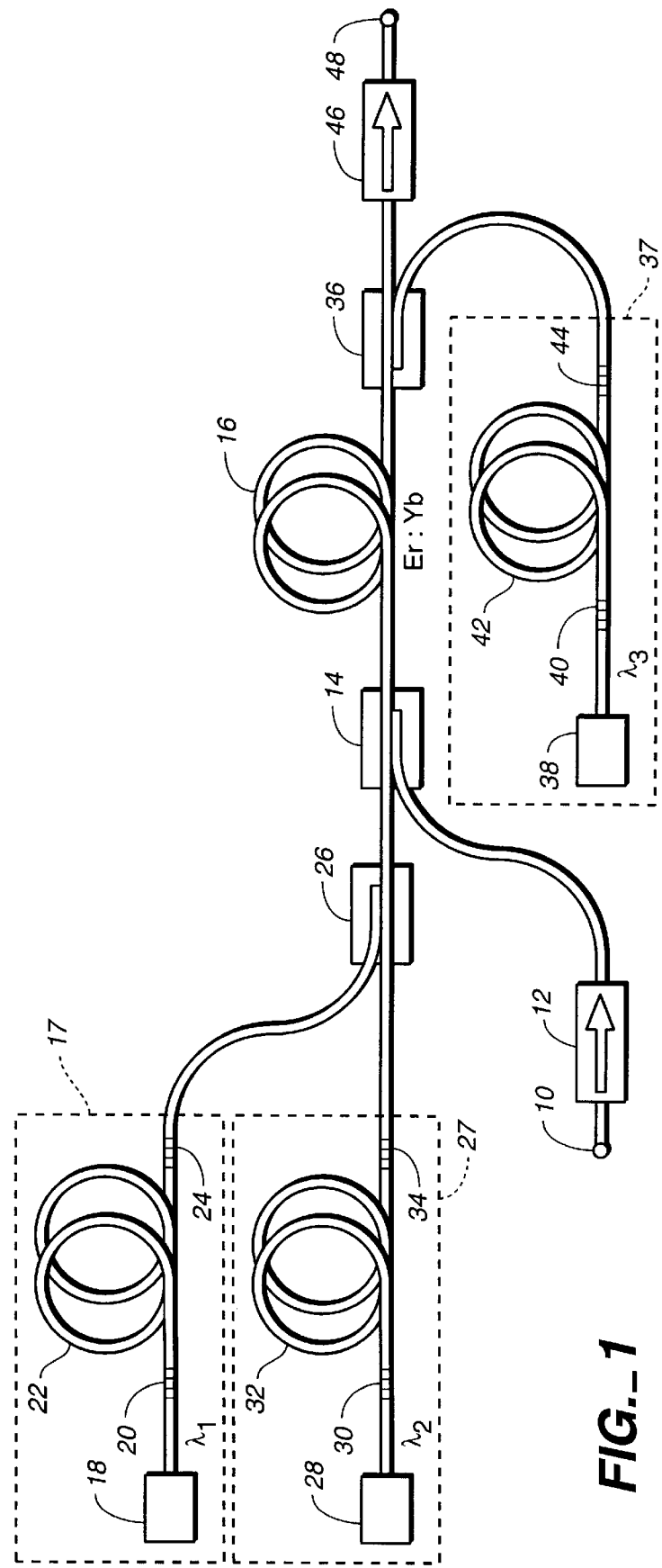
FIG._1

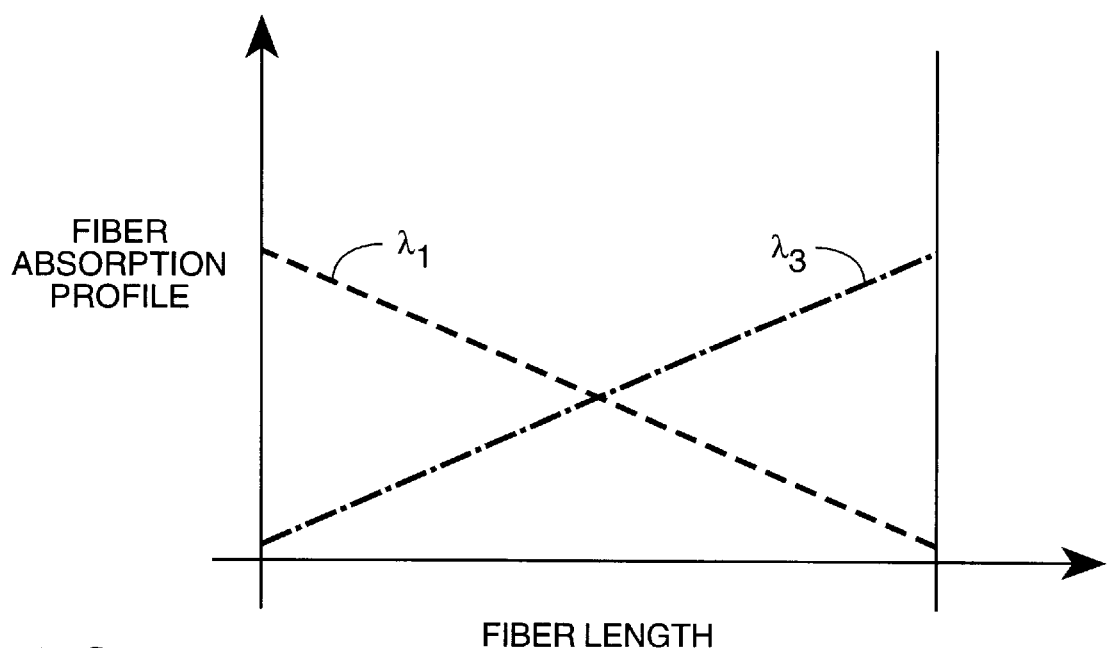
FIG._2A
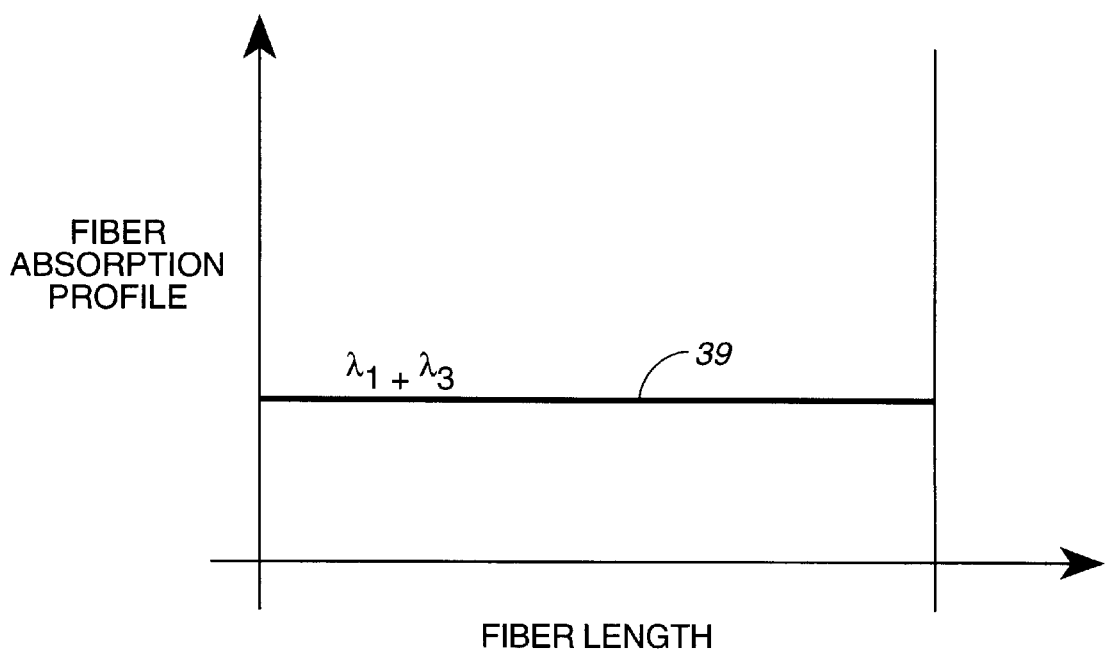
FIG._2B

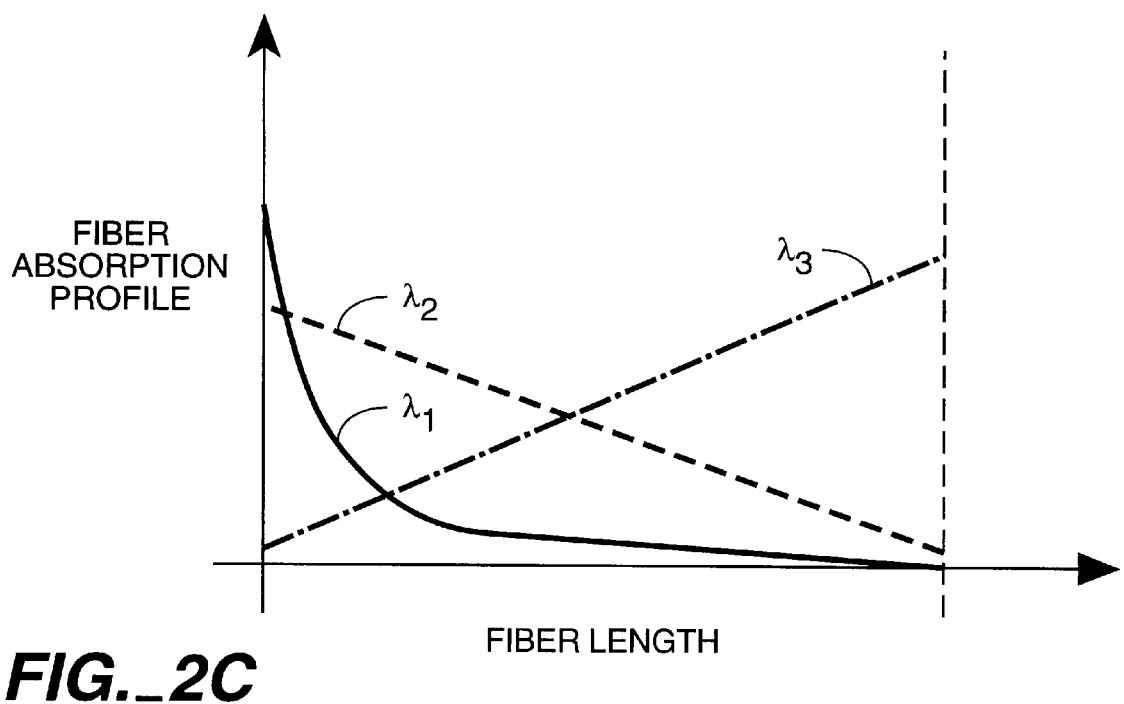
FIG._2C
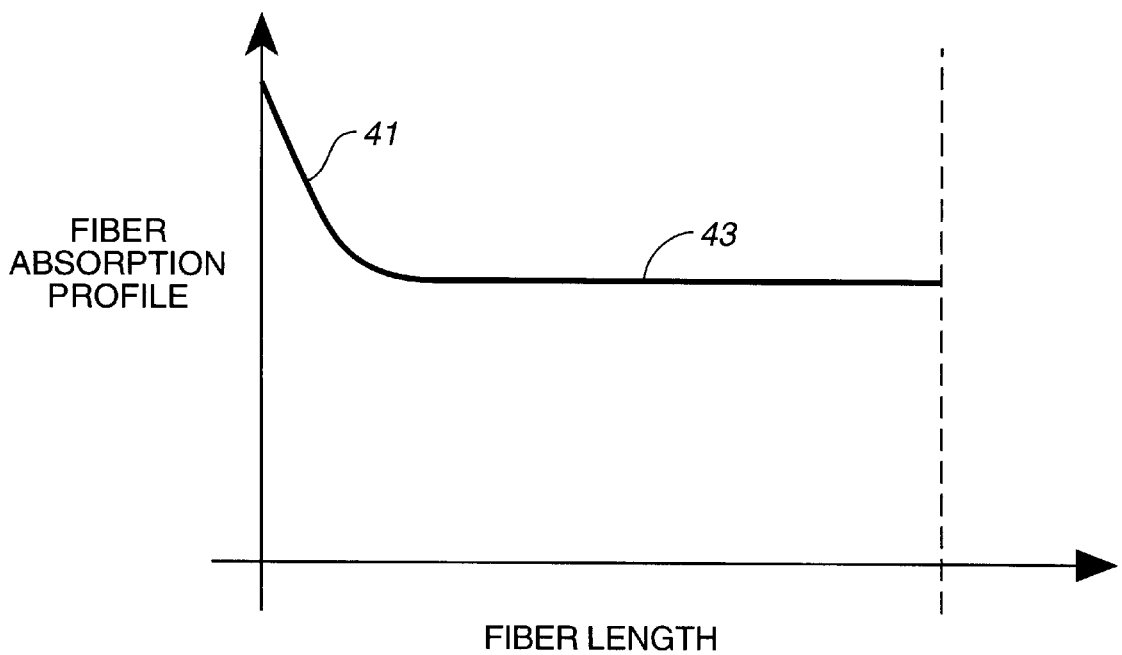
FIG._2D

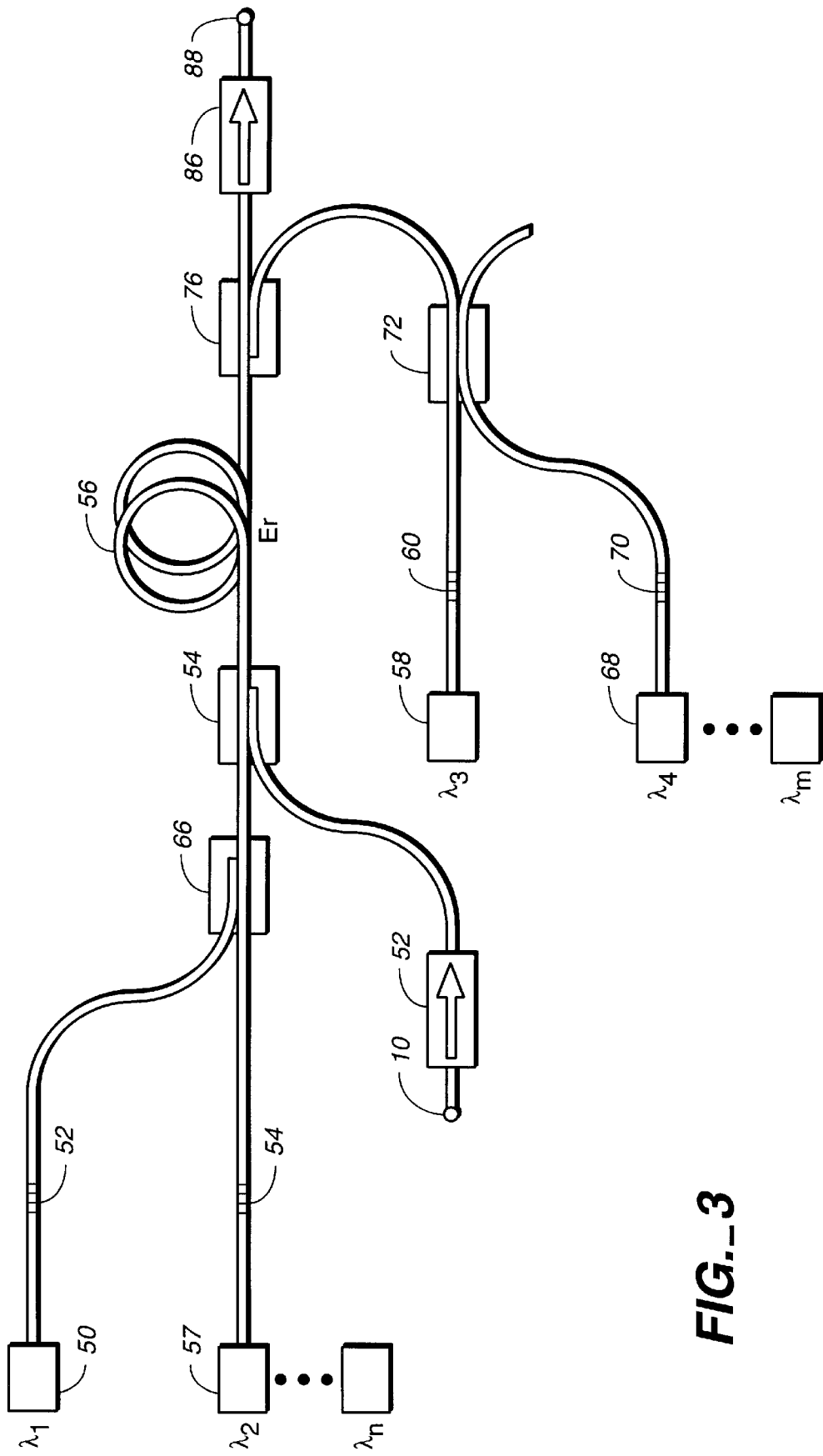
FIG._3

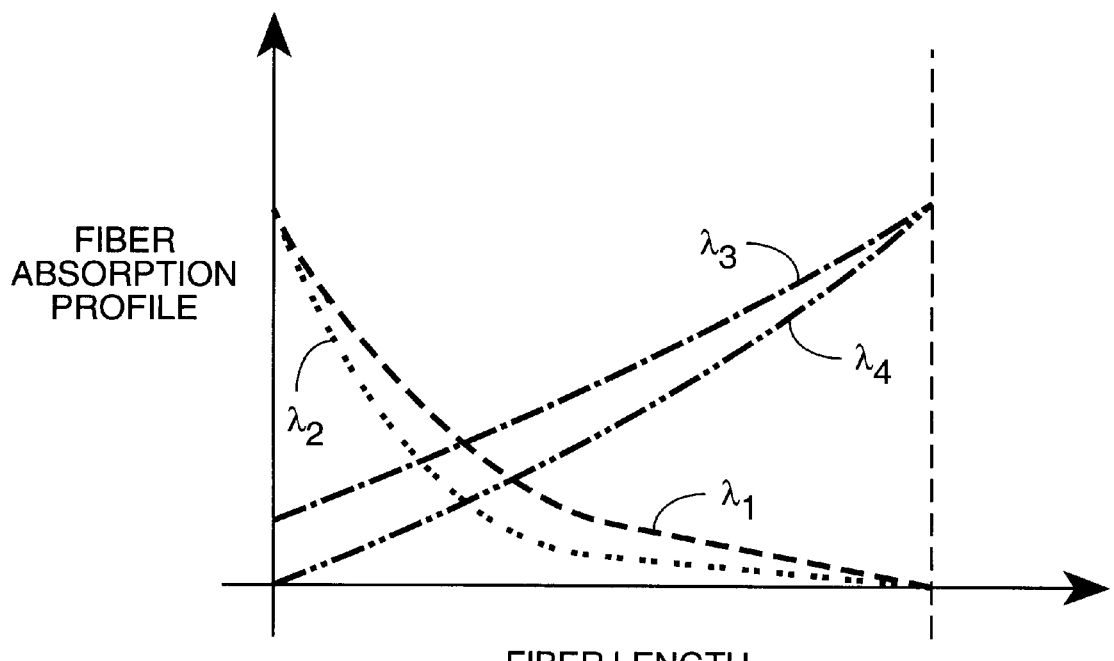
FIG._4A
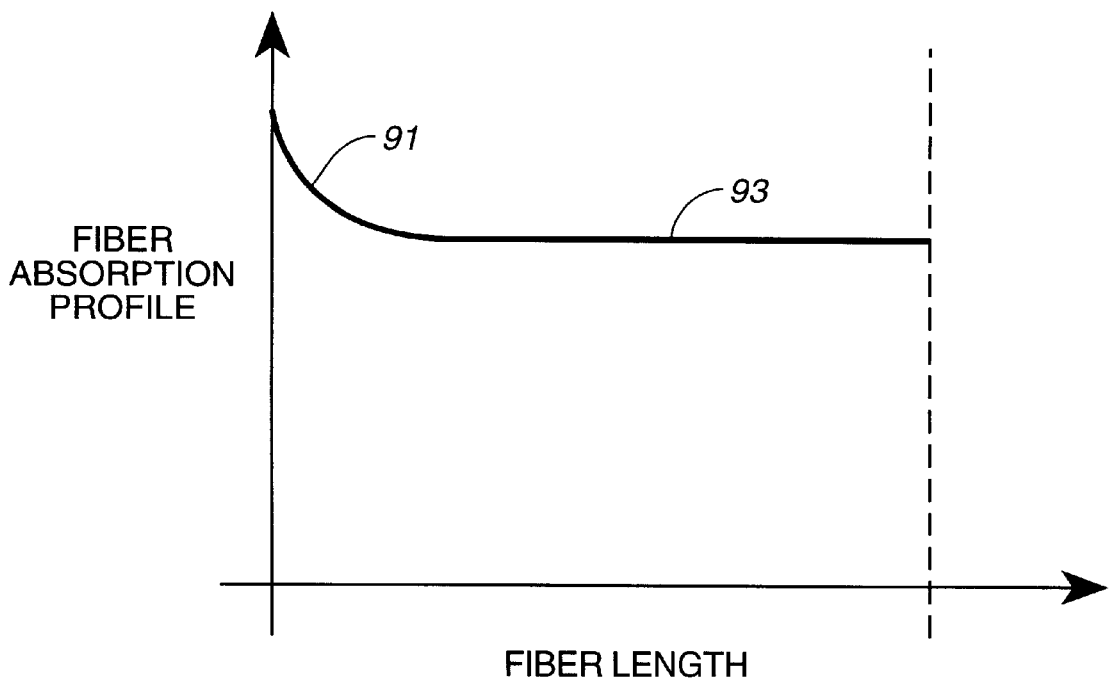
FIG._4B

OPTICAL FIBER AMPLIFIER WITH OPTIMIZED POWER CONVERSION

FIELD OF THE INVENTION

This invention relates generally to optical fiber amplifiers and, more particularly to pump power conversion efficiency in optimizing operation of optical fiber amplifiers through configuring of the absorption profile along the length of the amplifier.

BACKGROUND OF THE INVENTION

As is known in the art, an optical amplifier is a device that increases amplitude of an input optical signal that is launched into the amplifier fiber together with pump light. If the optical signal at the input to the amplifier is monochromatic, the output will also be monochromatic with the same frequency. A conventional fiber amplifier comprises a gain medium, such as a single mode, glass fiber having a core doped with an active material or dopant which is excited by pumping the fiber with optical energy at predetermined wavelengths within an absorption band of the fiber dopant. The input signal is provided to the gain medium, via an optical coupler with low insertion loss. The pump energy is combined with the input signal within the coupler and launched into the fiber core. If the fiber is a double clad fiber, then the pump light is launched into the inner cladding of the fiber while the signal is launched into the core. As is well known in the art, the pump energy produces a population inversion in the dopant, and the input signal is amplified by stimulated emission to produce an amplified output signal which is emitted from the other opposite end of the fiber. Such fiber amplifiers can be unidirectionally pumped with pump sources at one end or bi-directionally pumped with pump sources provided at opposite ends of the fiber, one co-propagating with the signal and the other counter-propagating with the signal. The employment of bi-directional pumps provides for higher power output and more power conversion efficiency in the fiber. A representative example of a bi-directionally pumped fiber amplifier is illustrated in the patent to Huber, U.S. Pat. No. 5,140,456. Typically, as taught in patent '456, co-pumping with 980 nm light provides for lowest noise figure performance at the amplifier input side of the erbium doped fiber amplifier (EDFA), and counter-pumping with 1480 nm light provides for highest conversion efficiency from the amplifier output side. In addition, crosstalk between 980 nm and 1480 nm pumps is minimal because their respective frequencies are so widely separated. Patent '456 also discusses the length of the amplifier fiber in context of fiber doping concentration level an a level of inversion necessary for amplifier operation determined by fiber emission and absorption. However, absent from the patent is any treatment for achieving maximum uniform conversion along the length of the fiber or consideration of the absorption profile along the length of the fiber relative to its chosen length.

Power conversion efficiency has been studied in rear earth doped fiber amplifiers since patent '456 indicating that the difference between forward and backward pumping schemes is primarily effected by the saturating effect by amplified spontaneous emission (ASE), and that highest conversion efficiency in forward and backward pumped, highly saturated Er doped fiber amplifiers is most closely reached with backward pumped Er doped fiber amplifiers. See the article of E. Desurvire, "Analysis of Gain Difference Between Forward- and Backward-Pumped Erbium-Doped Fiber Amplifiers in the Saturation Regime", *IEEE Photonics Technology Letters*, Vol. 4(7), pp. 711–714, July, 1992.

Optical fiber amplifiers are typically employed in a wide variety of applications, including, but not limited to, amplification of weak optical pulse such as those that have traveled through many kilometers of fiber length in optical telecommunication systems. Optical amplification can take place in a variety of materials including those materials, such as silica, from which optical fibers are typically formed. For example, the EDFA in patent '456 operates in a three level mode and is capable, when pumped with a wavelength of 980 nm, of amplifying a 1550 nm signal. Since 1550 nm is the lowest loss wavelength of conventional single mode silica glass fibers, EDFAs are well suited for fiber systems that propagate optical signals having wavelengths around 1550 nm.

One significant concern with fiber amplifiers is their power conversion efficiency, i.e., the optical amplification achieved with a given pump power level. In order to increase the conversion efficiency of an amplifier, the amplifier is typically pumped with pump energy that propagates in a direction counter to the input signal propagation direction, as previously indicated.

Also, of concern is the noise figure of the amplifier, which generally defined as the ratio of the output noise power to the amplifier input noise power. In order to decrease the noise figure of an amplifier, the amplifier is typically pumped with pump energy that propagates in the same direction as the input signal propagation direction, as previously indicated.

What is further desired is to provide (a) power scaling of the pump power utilizing pump sources that have different wavelengths for purposes of WDM combining while selecting their wavelengths of operation within the absorption band of an amplifier relative to its peak absorption wavelength to produce a particular composite absorption profile relative to the selected fiber length so as to achieve uniform conversion of the pump energy along the fiber length, and (b) noise figure optimization by judicious choice of co-pumping and counter-pumping with different wavelengths to take advantage of the wavelength-dependent pump absorption of the fiber amplifier Thus, it is an object of this invention to provide a fiber amplifier further optimized for power conversion and/or noise figure.

It is another object of this invention to utilize co-pumps and counter-pumps in a manner to tailor the pump gain distribution or the absorption profile along the length of the fiber to achieve different absorption/gain characteristics thereacross.

SUMMARY OF THE INVENTION

According to this invention, an optical fiber amplifier is bi-directionally pumped with both co-propagating and counter-propagating pump wavelengths chosen to have gain characteristics, within the absorption bandwidth of the dopant employed for the amplifier, to provide a desired composite absorption profile along the length of the fiber, such as, e.g., a profile that is substantially flat for a substantial portion of the fiber length. Typically, the absorption of the fiber amplifier and its profile along the length of the fiber varies with the pump wavelength selected within the amplifier absorption band. Thus, the counter-propagating and co-propagating wavelengths of pump light are selected so that an overall or composite pump energy profile along the length of the fiber provides for highest conversion efficiency uniformly along the length of the fiber. By mixing and matching co-pumped and counter-pumped sources, a predetermined absorption profile can be created along the length of the fiber. Also, these wavelengths are chosen so that the amplifier can maintain a low noise figure, where higher power input signals conditions may be present, with a substantially uniform conversion profile provided along the fiber length. Conversely, given a distribution of pump light wavelengths, the fiber length for the amplifier can be chosen to be optimum.

In this invention, the amplifier includes an optical fiber having a core doped or co-doped with rare earth materials, such as erbium (Er) or erbium/ytterbium (Er:Yb), through which an optical input signal propagates to achieve amplification. Pump energy for amplifying the input signal or signals is provided from a first pump source coupled to the input end of the fiber which generates optical energy at a first set of wavelengths. The energy is coupled into the optical fiber so as to propagate through the fiber in the same direction as the input signal. The first set of pump wavelengths are chosen to minimize the amplifier noise figure. The pump energy from the first pump source is absorbed according to a predetermined wavelength dependent absorption profile along the length of the fiber. Pump energy for amplifying the input signal or signals is also provided from a second pump source coupled near the output end of the fiber which generates optical energy at one or more wavelengths which comprise a second set of pump wavelengths. The second pump wavelength or wavelengths are chosen to maximize the conversion efficiency of the amplifier. The pump energy from the second pump source is absorbed according to a predetermined wavelength dependent absorption profile along the length of the fiber. Thus, by choosing the wavelengths of the co-propagating pump energy and the counter-propagating pump energy, the overall composite absorption profile developed through the selection of appropriate pump wavelengths within the absorption band of the fiber amplifier can be manipulated and tailored to enhance the overall conversion efficiency of the amplifier.

In accordance with one illustrative embodiment, the co-propagating and counter-propagating pump sources may be adjusted so that the composite pump energy remains substantially constant over a substantial portion of the optical fiber length so the gain conversion can be improved and optimized along the length of the fiber of the amplifier depending upon desired signal frequency or signal frequency band over which the optimized conversion is to be achieved. In one embodiment, a Er:Yb fiber amplifier is disclosed with co-propagating and counter-propagating pump wavelengths from fiber lasers in the range, for example, of 1060 nm to 1070 nm. Higher absorption is created in the fiber at the input end of the fiber amplifier with co-propagating shorted wavelength pump sources to provide for higher absorption deletion rate at the initial end of the fiber for lower noise figure, while counter-propagating longer wavelength pump sources are provided at the output end for enhancing the conversion efficiency along the fiber length and achieve a balance between the amplifier noise figure and its conversion efficiency. In another embodiment, an Er fiber amplifier is disclosed with multiple co-propagating and counter-propagating pump wavelengths, respectively, in the range, for example, of 970 nm to 985 nm and in the range, for example, of 1470 nm to 1490 nm. As is known in the art, the optical input signal is passed through an optical isolator at the amplifier input and, again at the amplifier output to minimize ASE and noise coming from optical component reflections or from an optical application to which the amplifier output is coupled.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a schematic view of an optimized fiber amplifier according to this invention employing bi-directionally coupled fiber lasers as pump sources.

FIG. 2A is graphical representation of the individual pump energy absorption profiles of bi-directional pumps, i.e., using one co-propagating and one counter-propagating pump in connection with a fiber amplifier.

FIG. 2B is a graphical representation of the composite absorption profile of the individual pump energy absorption profiles of FIG. 2A.

FIG. 2C is graphical representation of the individual pump energy absorption profiles of the several pumps employed in connection with the fiber amplifier shown in FIG. 1.

FIG. 2D is a graphical representation of the composite absorption profile of the individual pump energy absorption profiles of FIG. 2C.

FIG. 3 is a schematic view of a fiber amplifier according to this invention employing bi-directionally coupled semiconductor laser diodes as pump sources.

FIG. 4A is graphical representation of the individual pump energy absorption profiles of the several pumps employed in connection with an amplifier shown in FIG. 3.

FIG. 4B is a graphical representation of the composite absorption profile of the individual pump energy absorption profiles of FIG. 4A.

DETAILED DESCRIPTION OF THE PREFERRED EMBODIMENTS OF THE INVENTION

Reference is now made to FIG. 1 wherein there is shown an optical amplifier 16 which amplifies an optical input signal applied to the amplifier through input port 10. In the exemplary embodiment shown, the input signal may have a wavelength in a wavelength grouping around 1550 nm, which is within the peak transmission range of conventional silica-based optical fiber. The input signal is passed through optical isolator 12 which, as known in the art, prevents feedback of the signal to an optical signal source connected to port 10. From isolator 12, the signal is coupled into fiber amplifier 16 via wavelength division multiplexer (WDM) 14.

Amplifier 16 is a conventional fiber having a core doped with a rare earth material. The material used to dope fiber 16 is selected, based on the wavelength of the input signal of the amplifier, since different doping materials have gain bandwidths centered at different wavelengths. For illustration here, fiber 16 is co-doped with erbium (Er) and ytterbium (Yb) forming an Er/Yb amplifier and has a gain bandwidth centered around 1550 nm. Relative to this doping material, fiber amplifier 16 can be pumped with optical energy with a plurality of wavelengths around the 1060 nm band. As is known in the art, this pump wavelength band is strongly absorbed by the Er/Yb dopant and produces good pump energy conversion.

In the embodiment of FIG. 1, fiber amplifier 16 is pumped with pump energy generated by a plurality of pump sources 17, 27 and 37, the output of each of which is optically coupled to amplifier 16. For purposes of this invention, however, the bi-directional pumping configuration comprising a single co-propagating pump, such as pump 17, and a single counter-propagating pump 37 represents the minimal pumping configuration for the practice of this invention. As illustrated diagrammatically in FIG. 2A, if the length of the fiber for amplifier 16 is chosen such that the absorption depletion rate for co-propagating pump 17 at $\lambda_1$ fairly matches the absorption depletion rate for counter-propagating pump 37 at $\lambda_3$ for a given doping concentration, dopant and inversion level of the particular fiber, then the length of the fiber is chosen so that the respective depletion rates are approximate of the mid-point of the fiber, i.e., the wavelengths for $\lambda_1$ and $\lambda_3$ within the absorption band of the fiber are chosen relative to a peak absorption wavelength of the fiber so that their composite effect provides for a substantially uniform absorption profile along the length of its fiber. The additive result of the absorption profiles will be a substantially uniform composite profile 39 of inversion along the length of the fiber utilizing the entire fiber length for optimized inversion.

It is possible that the selection of co-propagating pump 17 at $\lambda_1$ to fairly match the absorption depletion rate for counter-propagating pump 37 at $\lambda_3$ may not be fully complete so that additional modification to achieve an overall more uniformly flat composite profile may be desired. Additional pump sources, either co-propagating or counter-propagating, can be added on either side of amplifier 16 to further reconfigure and refine the composite absorption profile via the individual pump distribution profiles as selected. Pump source 17 comprises a semiconductor laser diode pump source 18, highly reflective Bragg grating 20 (highly reflective at the fiber laser wavelength), Yb doped fiber 22 and partially reflective Bragg grating 24 (partially reflective at the fiber laser wavelength). The reflectivity level of grating 20 should be as high as at least 80% in order to avoid light leakage at the fiber laser wavelength back into the diode pump source 18. Optical energy from pump diode 18, for example, at a wavelength of 915 nm, is coupled into fiber laser 22, and a resonator cavity is established between gratings 20 and 24. The wavelength of operation of laser 22 is selected by gratings 20 and 24 for operation in the band of wavelengths of about 1040 nm to about 1080 nm which, in the example here is $\lambda_1$=1060 nm. Fiber 22 doped with Yb has a gain bandwidth that includes the 1060 nm wavelength. It should be noted that, instead of a single laser diode 18, multiple laser diodes may be WDM combined as input into fiber laser 22. This also true for sources 27 and 37. A substantial portion of the optical energy developed by pumped fiber laser 22 proceeds through grating 24 and is coupled into WDM coupler 26.

A second source 27 comprises laser diode 28 or more, highly reflective Bragg grating, Yb doped fiber 32, and partially reflective Bragg grating 34. Fiber laser 32 is of the same design as fiber laser 22 except that gratings 30 and 34 and cavity length are designed to produce a spatially different wavelength in the gain bandwidth of Yb, e.g., $\lambda_2$=1070 nm. The light output from laser source 27 is also coupled into WDM coupler 26. For example, WDM coupler may be a fused biconical coupler for transmission of $\lambda_1$ and $\lambda_2$. The coupled pump energy is then launched into fiber amplifier 16 via WDM coupler 14 together with input signal 10. The amplified optical output from fiber amplifier 16 is passed through optical isolator 46 to output port 48 where it is delivered to a desired applications, such as in an optical telecommunications system or a CATV system. Optical isolator 46 prevents feedback of any portion of the amplified optical signal as well as spurious feedback and noise from optical components in the application coupled at the amplifier output 48.

A third source 37 comprises laser diode 38 or more, highly reflective Bragg grating 40, partially reflective Bragg grating 44 and Yb doped fiber 42. Fiber laser 42 provides an output wavelength of light within the gain bandwidth of Yb as governed by the fiber length and the formed grating period. The wavelength is different from the pump sources 17 and 27 and is preferably intermediate thereof for purposes of establishing uniformity in gain across fiber amplifier 16, which will be explained in more detail later. However, the wavelength of operation established for laser source 42 can be outside the spatial wavelength separation between sources 17 and 27, here a 10 nm spacing, as long as it is in the absorption bandwidth for Er/Yb. In the particular example here, pump wavelength, $\lambda_3$, is established as wavelength intermediate of pump wavelengths $\lambda_1$ and $\lambda_2$, e.g., 1065 nm. The optical energy from pump source 42 is coupled into fiber amplifier 16 via WDM coupler 36 in a direction opposite to that of the coupled energy from sources 17 and 27. As a result, the pump energy propagates through fiber amplifier 16 in a direction opposite to that of the optical signal at port 10.

The absorption profile of the pump radiation at wavelengths $\lambda_1$, $\lambda_2$ and $\lambda_3$ is different from one another as illustrated in FIG. 2A. Since the $\lambda_3$ radiation propagates through fiber amplifier 16 in a direction opposite to the $\lambda_1$ and $\lambda_2$ radiation, the absorption profile for $\lambda_3$ is purposely selected intermediate of the absorption profiles for $\lambda_1$ and $\lambda_2$, i.e., intermediate in absorption and, also, is somewhat of reverse form compared to the absorption profiles for $\lambda_1$ and $\lambda_2$. FIG. 2A represents a plot of the local gain or inversion in the fiber (along the vertical axis) versus fiber length (along the horizontal axis) of fiber amplifier 16. In other words, the vertical direction in the graph represents the magnitude of population inversion, and the corresponding emission of energy at the wavelength of the input signal, is occurring at a location along the length of the fiber, indicated by position along the fiber in the horizontal direction. More specifically, the left-to-right direction of the horizontal direction represents relative distance along fiber 16 approximately between WDM couplers 14 and 36. As indicated, more energy at wavelength $\lambda_1$ is initially absorbed since it is close to or approximates the peak absorption wavelength for Er/Yb, compared to the other two wavelengths, $\lambda_2$ and $\lambda_3$, which are further away from peak absorption. Thus, local absorption, and hence the local gain, decreases rapidly along an initial length of fiber 16 for $\lambda_1$. Thus, since this wavelength, $\lambda_1$, of light is approximate of the absorption peak wavelength, the initial absorption is very high and depletes the pump energy of source 17 at a faster rate compared to the other wavelengths. In contrast, the absorption energy of wavelength, $\lambda_2$, which among all three wavelengths of light involved is the farthest from the peak absorption wavelength, has less absorption along the fiber length and therefore, has less local initial absorption than $\lambda_1$. Thus, the absorption energy of wavelength $\lambda_2$ is depleted more slowly along the length of the fiber, and, as a result, the relative local absorption (and local gain) for $\lambda_2$ tends to diminish more slowly along the length of fiber 16. The rate per unit length absorption of wavelength $\lambda_3$ is intermediate of the rate per unit length absorption of wavelengths $\lambda_1$ and $\lambda_2$ and will comparatively have an absorption depletion rate substantially equal to and opposite of the combined absorption depletion rate of the absorption energies at wavelengths $\lambda_1$ and $\lambda_2$. Thus, with bi-directional pumping, a relatively large amount of absorption will occur near the output end of fiber 16 due to pump 37 which is monotonically depleted over the length of the fiber toward its input end. The combination of the absorption profiles for $\lambda_1$ and $\lambda_2$ represents a high amount of absorption at the input end of fiber amplifier 16 compared to the absorption profile for $\lambda_3$ at the output end of amplifier 16. As the doping of fiber 16 along its length is substantially uniform, it can be seen that the use of the full absorption capabilities of the entire length of the fiber would not be utilized without the counter-propagating pump light from at least one counter-propagating source 37 as indicated in U.S. Pat. No. 5,140,456.

As illustrated in FIG. 2B, however, by selecting a wavelength for the counter-propagating pump source within absorption band of the fiber amplifier to have a depletion rate that is substantially the same as a combined depletion rate of the co-propagating pump sources, a composite absorption profile of the amplifier is produced that is substantially flat along the length of fiber 16. As a result, a substantially flat profile is produced which provides an efficient rate of power conversion and, therefore, optimizes the output power of fiber 16 for given input pump power and wavelength at a given input signal wavelength. While the leftmost portion of the composite absorption profile is high at an input portion 41, due to the initially high absorption for both $\lambda_1$ and $\lambda_2$, particularly peak absorption of $\lambda_1$, the composite absorption profile is relatively flat over a substantial portion 43 of the length of fiber 16. Since abnormally high amounts of absorption at any given location along the fiber contribute nonlinearly to the output noise of the amplifier, it is believed that a high input profile 41 also serves to minimize the noise figure of the amplifier for a given amplifier gain. Thus, the composite combination of FIG. 2A provides for comparatively higher power due to establishing more uniform energy absorption along the entire length of the fiber as well as providing a peak absorption at the input that is believed to contribute to low noise amplification.

As previously indicated, multiple pump sources may be employed at either end of fiber amplifier 16. The use of multiple pumps, i.e., two or more pump modules with their outputs WDM combined, permits the launching of more power in amplifier 16 and increase the signal output power by the same ratio. The use of multiple pumps for various particular configurations is illustrated in patent application, Ser. No. 08/955,883, filed Oct. 21, 1997 to Robert G. Waarts et al. entitled, "High Power Fiber Gain Media System Achieved Through Power Scaling via Multiplexing", which is owned by the assignee herein and is incorporated here in its entirety by reference thereto. By mixing and matching co-pumped and counter-pumped modules with their individual pump sources stabilized at different pump wavelengths within the absorption bandwidth of the doped amplifier with the counter-propagating wavelengths at least, in part, between the peak absorption wavelength and other co-propagating wavelengths further away from the peak absorption wavelength, a composite absorption profile for the amplifier can be created along the length of fiber that is substantially flat along a substantial portion of its fiber length. However, other composite absorption profiles can be similarly created with the use of multiple pumps, such as monotonically increasing or montonically decreasing gain profile across the length of the fiber with a monotonic or uniform depletion rate of gain along the fiber length governed by the chosen wavelengths of the co-propagating and counter-propagating pumps. Such a combination of multiple pump modules is illustrated in the embodiment of FIG. 3.

In FIG. 3, a plurality of pump sources 50, 57, etc. with different wavelengths are WDM combined via optical coupler 66 which may be, for example, dichroic mirror couplers, directional fiber couplers, or n×n couplers. Sources 50 and 57 may be semiconductor laser diodes formed as pump modules with respective wavelength stabilizing gratings 52, 54, etc. to stabilize the output wavelengths of the laser diodes at designated different wavelengths within a first absorption bandwidth of fiber amplifier 56. An example of such pump modules are disclosed in U.S. Pat. No. 5,485,481 and U.S. Pat. No. 5,715,263 to Ventrudo et al., both of which are assigned to the same assignee herein and are incorporated here by their reference. As an exemplary example, fiber amplifier 56 may be doped with Er or other rare earth material, or co-doped with Er/Yb. The output wavelengths from pump sources 50, 57, etc. may, respectively, be $\lambda_1$=970 nm, $\lambda_2$=980 nm, etc. or other stabilized wavelength between these values. The combined outputs of these pump sources are provided on a single mode fiber for optical coupling, via optical coupler 54, together with an input signal at port 10, through isolator 52, for launching into fiber amplifier 56. Thus, the WDM combined pump sources are co-propagating with input signal 10. It should be noted that fiber 56 may also be a double clad fiber where the combined pump power from pump sources 50, 57, etc. is launched into the inner cladding of the fiber while the input signal from port 10 is launched into the fiber core via appropriate optical coupling as is known and described in the art. The amplified optical output from fiber amplifier 56 is passed through optical isolator 86 to output port 88 where it is delivered to a desired application, such as in an optical telecommunications system or a CATV system. Optical isolator 86 prevents feedback of any portion of the amplified optical signal as well as spurious feedback and noise from optical components in the application coupled at the amplifier output 88.

A plurality of pump sources 58, 68, etc. provided for counter-propagating energy adjacent to the output end of fiber amplifier 56, with a plurality of different wavelengths which are WDM combined via one or more optical couplers 72. Couplers 72 may be, for example, dichroic mirror couplers, directional fiber couplers, or n×n couplers. Sources 58, 68, etc. may be semiconductor laser diodes formed as pump modules with respective wavelength stabilizing gratings 58, 68, etc. to stabilize the output wavelengths of the laser diodes to be at designated different wavelengths within a second absorption bandwidth of fiber amplifier 56. As an exemplary example, where fiber amplifier 56 is doped with Er, the output wavelengths from pump sources 58, 68, etc. may, respectively, be $\lambda_3$=1470 nm, $\lambda_4$=1480 nm, etc. or other stabilized wavelength between these values. As in the case of U.S. Pat. No. 5,140,456, the wavelengths in the first absorption band are chosen to provide for a low noise figure, while the wavelengths in the second absorption band are chosen to provide for high power efficiency. What is different, however, is that multiple combinations of such pump sources in the respective absorption bandwidths of fiber amplifier 56 are tailored to provide a composite absorption profile along the length of the fiber, such as a flat absorption profile across the length of the fiber, a monotonically increasing or monotonically decreasing absorption profile across the length of the fiber, or any other possible composite configuration achieved through multiple combinations of co-propagating and counter-propagating pump sources. The result is a significantly higher pump power with resulting higher amplified signal that is optimized for maximized energy absorption by tailoring the composite profile formed by the individual conversion profiles of the multiple co-propagating pumps and counter-propagating pumps, each having a different absorption rate along the fiber length, resulting in different absorption slopes (different absorption depletion rates) along the fiber length. By selecting different wavelengths of light within the absorption band of the fiber amplifier relative to its peak absorption wavelength for the particular dopant or dopants employed, the composite absorption profile can be created from the individual profiles by selecting the individual absorption wavelengths with absorption slopes or absorption depletion rates, the composite of which produce the resultant profile configuration desired, such as a substantially flat contour along a substantial portion of the fiber length of the amplifier.

An example of the individual absorption profiles and their resulting composite profile is shown in FIGS. 4A and 4B for the embodiment shown in FIG. 3. Pump source 50, via output grating 52, provides an output wavelength of $\lambda_1$=970 nm whereas pump source 57, via output grating 54, provides an output wavelength of $\lambda_2$=980 nm. As can be seen in FIG. 4A, $\lambda_2$ has a faster absorption deletion rate compared $\lambda_1$ to because $\lambda_2$ more closely approximates the peak absorption wavelength of Er doped fiber amplifier 56. Pump source 58, via output grating 60, provides an output wavelength of $\lambda_3$=1470 nm whereas pump source 68, via output grating 70, provides an output wavelength of $\lambda_2$=1480 nm. The absorption deletion rate of $\lambda_3$ and $\lambda_4$ are approximately the same, being the redband portion of the nominal signal bandwidth for Er. However, as seen in FIG. 4B, the composite absorption profile for all four wavelengths, $\lambda_1$, $\lambda_2$, $\lambda_3$ and $\lambda_4$, provides for a substantially uniform flat conversion profile 93 for a substantial length of the fiber with an initial portion 91 that provides for initial enhanced absorption providing for a lower noise figure for amplifier 56. For flat or uniform portion 93, it can be seen that the absorption profile for wavelength outputs $\lambda_3$ and $\lambda_4$ are chosen to be substantially reverse of wavelength outputs $\lambda_1$ and $\lambda_2$, respectively, so that the additive gain distribution along the length of the fiber, respectively, between wavelength outputs $\lambda_3$ and $\lambda_2$ and between wavelength outputs $\lambda_3$ and $\lambda_4$ provides for a flat profile 93.

Although the invention has been described in conjunction with one or more preferred embodiments, it will be apparent to those skilled in the art that other alternatives, variations and modifications will be apparent in light of the foregoing description as being within the spirit and scope of the invention. For example, countless variations of co-propagating and counter-propagating pump energies of different wavelengths, when combined with different doped fiber materials, will allow for numerous other designs to be created using the inventive concepts taught herein. Likewise, different types of pump sources may also be employed with minimal spatial wavelength separation for DWDM combining as a combined pump source. Finally, applying the teachings herein, one skilled in the art can generate other composite absorption profiles that are not necessarily flat, as previously indicated, to take on different profiles that may be useful for other applications. Thus, the invention described herein is intended to embrace all such alternatives, variations and modifications that may fall within the spirit and scope of the following claims.

What is claimed is:

1. A fiber amplifier having an active dopant along its fiber length providing a peak absorption wavelength, the amplifier pumped by a plurality of laser sources comprising a first laser source having its pump light propagating through the amplifier in a direction that is the same as signal propagation through the amplifier and at least one second laser source having its pump light propagating through the amplifier in a direction opposite to signal propagation through the amplifier;

the improvement comprising said first and second pump sources having adjustable wavelengths of operation relative to a peak absorption wavelength of the fiber amplifier to respectively permit variation of their absorption depletion rates along the fiber length so that their composite effect provides for a substantially uniform absorption profile of pump light along the fiber length.

2. The fiber amplifier of claim 1 wherein the wavelength of said first laser sources is chosen to have a peak inversion in an input portion of the amplifier fiber to contribute to a low amplifier noise figure.

3. The fiber amplifier of claim 1 wherein there are a plurality of said first laser sources and one of said first laser sources has a wavelength that approximates the peak absorption wavelength of the fiber amplifier.

4. The fiber amplifier of claim 3 wherein one of said first laser sources has a wavelength that approximates the peak absorption wavelength of the fiber amplifier and the other of said first laser sources and said at least one second laser source have wavelengths spaced from the peak absorption wavelength but within the absorption band of the fiber amplifier, an absorption depletion rate along the fiber for said sources selected such that the absorption depletion rate for said at least one second laser source is between that of said first laser sources.

5. The fiber amplifier of claim 1 wherein said first or second pump sources are semiconductor laser diodes, WDM combined semiconductor laser diodes, fiber lasers, or WDM combined fiber lasers.

6. The fiber amplifier of claim 5 wherein said fiber amplifier is an Er doped fiber amplifier or an Er/Yb doped fiber amplifier, the pump wavelength band for said pump sources is around 890 nm, around 1060 nm or around 1480 nm.

7. The fiber amplifier of claim 5 wherein at least one of said pump sources are wavelength stabilized by a grating.

8. The fiber amplifier of claim 5 wherein several of said pump sources are wavelength stabilized by a grating.

9. The fiber amplifier of claim 5 wherein all of said pump sources are wavelength stabilized by a grating.

10. The fiber amplifier of claim 5 wherein said pump sources are separated by less than 11 nm.

11. The fiber amplifier of claim 1 wherein the composite absorption profile is substantially constant over at least 70% of the fiber length with a peak portion formed at an input portion of the fiber amplifier.

12. A method of achieving a substantially uniform absorption profile along the length of a fiber comprising a fiber amplifier for amplifying an input signal, comprising the steps of:

providing a plurality of pump sources for the fiber amplifier, one of the pump sources input co-propagating with the input signal in the amplifier and one of the pump sources input counter-propagating with the input signal in the amplifier;

selecting the wavelengths of operation of the pump sources within an absorption band of the fiber amplifier such that substantially uniform gain and resulting uniform absorption profile along the length of its fiber.

13. The method of claim 12 further comprising the step of:

selecting a wavelength for the counter-propagating pump source within absorption band of the fiber amplifier to have a depletion rate that is substantially the same as a depletion rate of the co-propagating pump source so that a composite absorption profile of the amplifier is substantially flat.

14. The method of claim 13 further comprising the step of:

selecting a wavelength for the co-propagating pump source within absorption band of the fiber amplifier to have a peak inversion in an input portion of the amplifier fiber to contribute to a low amplifier noise figure.

15. The method of claim 12 further comprising the step of:

selecting a wavelength for the counter-propagating pump sources within absorption band of the fiber amplifier to have a depletion rate that is substantially the same as a depletion rate of the co-propagating pump sources so that a composite absorption profile of the amplifier is substantially flat.

16. The method of claim 15 further comprising the step of:

selecting a wavelength for the co-propagating pump source within absorption band of the fiber amplifier to have a peak inversion in an input portion of the amplifier fiber to contribute to a low amplifier noise figure.

17. A fiber amplifier, comprising:

a doped fiber;

a plurality of pump lasers for pumping the fiber amplifier; and means for adjusting the wavelengths of said pump lasers to actively vary the absorption rate of pump light absorbed by said amplifier along the length of the fiber to enhance the amplifier gain flatness or lower its noise figure.

18. The fiber amplifier of clam 17 wherein said adjusting means comprises independent adjustment of the wavelength of one or more of the pump lasers.

19. The fiber amplifier of clam 18 wherein at least some said pump lasers are wavelength stabilized by a fiber grating coupled at the output of the pump lasers.

20. The fiber amplifier of clam 17 wherein at least some of said pump lasers are semiconductor lasers.

21. The fiber amplifier of clam 17 wherein at least some of said pump lasers are fiber lasers.

22. A fiber amplifier, comprising:

a plurality of pump lasers coupled to opposite ends of the fiber amplifier for pumping the fiber amplifier;

the improvement comprising adjusting the wavelengths of pump lasers to have absorption depletion rates along the fiber length so that their composite effect provides for a substantially uniform absorption profile along the length of its fiber.

23. The fiber amplifier of claim 22 wherein the wavelength of at least one said pump lasers is chosen to have a peak inversion at an input of the amplifier fiber to provide for low amplifier noise figure.

24. The fiber amplifier of claim 23 wherein said at least one pump laser provides pump signal co-propagating with a signal to be amplified in the fiber amplifier.

* * * * *